United States Patent [19]

DeLeeuw et al.

[11] Patent Number: 6,006,282
[45] Date of Patent: Dec. 21, 1999

[54] BLOCKING HOST INPUT WHILE A REMOTE GUEST HAS INPUT CONTROL TO A HOST-EXECUTED SHARED APPLICATION

[75] Inventors: William C. DeLeeuw, Hillsboro; David L. Anderson, Portland, both of Oreg.

[73] Assignee: Intel Corporation, Santa Clara, Calif.

[21] Appl. No.: 08/565,953

[22] Filed: Dec. 1, 1995

[51] Int. Cl.⁶ .............................. G06F 13/00; G06F 13/14
[52] U.S. Cl. .............................. 710/5; 709/208; 709/209; 709/210; 345/329; 345/331
[58] Field of Search ................................ 345/331, 329; 395/200.04, 200.05, 200.09, 825, 827; 711/147; 709/200, 208, 210; 710/5, 6

[56] References Cited

U.S. PATENT DOCUMENTS

| | | | |
|---|---|---|---|
| 4,901,232 | 2/1990 | Harrington et al. | 395/826 |
| 5,555,385 | 9/1996 | Osisek | 711/1 |
| 5,557,725 | 9/1996 | Ansberry et al. | 395/331 |
| 5,727,155 | 3/1998 | Dawson | 395/200.35 |
| 5,758,110 | 5/1998 | Boss et al. | 345/329 |

Primary Examiner—Eddie P. Chan
Assistant Examiner—Hong C. Kim
Attorney, Agent, or Firm—Duane, Morris & Heckscher LLP; William H. Murray; N. Stephan Kinsella

[57] ABSTRACT

Host input to a shared application is blocked while a guest has input control. Patch instructions are written over keyboard and mouse event procedures, which are operating system subroutines defining the normal entry points to the system queue for host mouse and keyboard events generated by host-mouse and keyboard drivers. The patch instructions call a patch subroutine which were written into the host-executed application-sharing program. The patch subroutine is operable to determine whether the host has control to enter the mouse and keyboard events into the system queue. If the host is without input control, the patch subroutine drops the events and replaces the patch instructions to their prior position on the keyboard or mouse event procedures. If the host has input rights, the original keyboard or mouse event code is written over the patch instruction and returned for execution. After execution, in which the keyboard or mouse event is deposited, the patch subroutine directs a replacement of the patch instruction over the keyboard or mouse event procedure. In a preferred embodiment, the host is able to take control at any time, to ensure execution of host events.

20 Claims, 4 Drawing Sheets

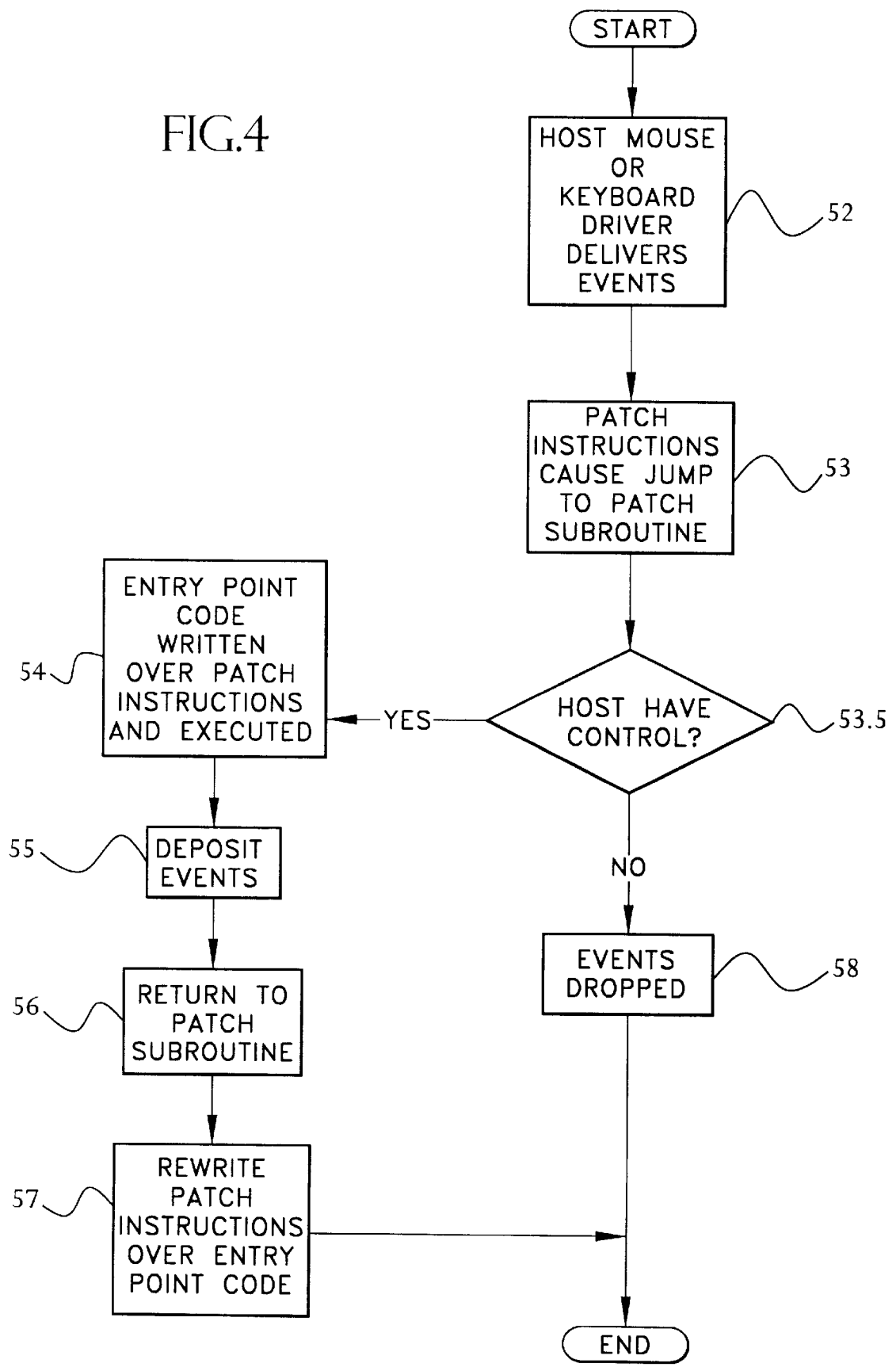

BLOCKING HOST INPUT WHILE A REMOTE GUEST HAS INPUT CONTROL TO A HOST-EXECUTED SHARED APPLICATION

BACKGROUND OF THE INVENTION

1. Field of the Invention

This invention relates to the field of applications sharing between computers.

2. Description of the Related Art

Applications sharing involves the sharing of one or more applications programs between two or more computers. The one or more applications reside on a host computer, and are shared with one or more remote computers, generally identified as guests. All mouse input to a shared application is made via a shared mouse input stream and all alphanumeric input to a shared application is through a shared keyboard input stream. The shared input streams are actually part of the host system, since the shared applications reside on and are executed by the host system. The monitor of each participant involved in sharing an application displays some portion of the application's output. Each participant typically is given an opportunity to move a shared mouse cursor and make alphanumeric data entries via, for example, a mouse and keyboard, respectively, which are reflected on that participant's own display monitor as well as on the monitors' of the other applications-sharing participants.

A problem arises in the applications-sharing field when two or more participants, particularly a guest and the host, simultaneously enter data into a shared application or move the shared mouse cursor. Such actions result in unintelligible data entry, resulting from an interleaving of the simultaneous alphanumeric input from the two or more participants and confusing and chaotic movement of the shared mouse cursor, which will move haphazardly about each participant's monitor. Conventional applications-sharing systems generally prevent simultaneous shared cursor movement or data entry by two or more guests, generally through a turn-taking mechanism in the applications-sharing software which governs which participant has control to enter data or move the cursor. Nevertheless, conventional systems do not prevent the host from intruding on a guest having control by simultaneously entering keyboard input or moving the shared cursor, primarily because the input systems being shared essentially belong to the host.

A mechanism is needed, therefore, for inhibiting a host from inputting to a locally running application being shared with one or more remote guests, when one of the guests has control for entering input to the shared application. It would be advantageous to provide the guests in an applications-sharing system with controlled turns for entering input to a shared application and exclusive rights for entering the input during the turn.

SUMMARY OF THE INVENTION

The invention concerns applications sharing between a host and at least one guest, the host and at least one guest generate host and guest input, respectively, for a shared application. The invention determines whether the host has control to enter host input to the shared application. The host input is entered if it is determined that the host has the control to enter the input. In a preferred embodiment, the host input is discarded if the host is without control to enter input.

BRIEF DESCRIPTION OF THE DRAWINGS

The following detailed description will be more fully understood with reference to the accompanying drawings in which:

FIG. 4 is a flow chart showing the processing of host mouse and keyboard events by a preferred embodiment of the invention.

DETAILED DESCRIPTION OF THE PREFERRED EMBODIMENTS

Figure 1:
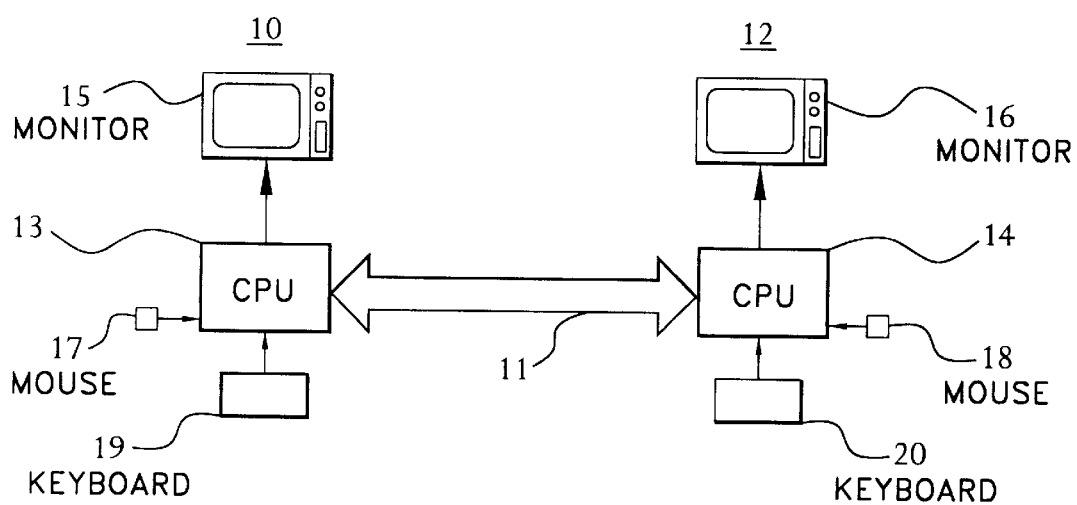
FIG. 1 is a block diagram of coupled applications-sharing hardware, including a host computer and a guest computer.

Referring to FIG. 1, two remote computer devices, such as remote personal computers, are coupled to share data. A first computer 10 is bidirectionally coupled over network 11 to second computer 12. Network 11 is preferably a local area network (LAN) or wide area network (WAN) and may be, for example, a connection made by a digital data line, telephone line, optical fiber, satellite or microwave transmission, coaxial cable or any other suitable communications link. First and second computers 10 and 12 include, for example, central processing units (CPUs) 13, 14 coupled to monitors 15, 16, respectively, for data display. Mouse devices 17, 18 and keyboards 19, 20 are coupled to CPUs 13, 14, respectively, for data input. Although FIG. 1 shows only two remote computer devices coupled by bidirectional network 11, additional computer devices may be coupled over network 11 in such a manner as to share data and, as will be explained below, this invention can be used on such configurations having more than two coupled computers.

Figure 2:
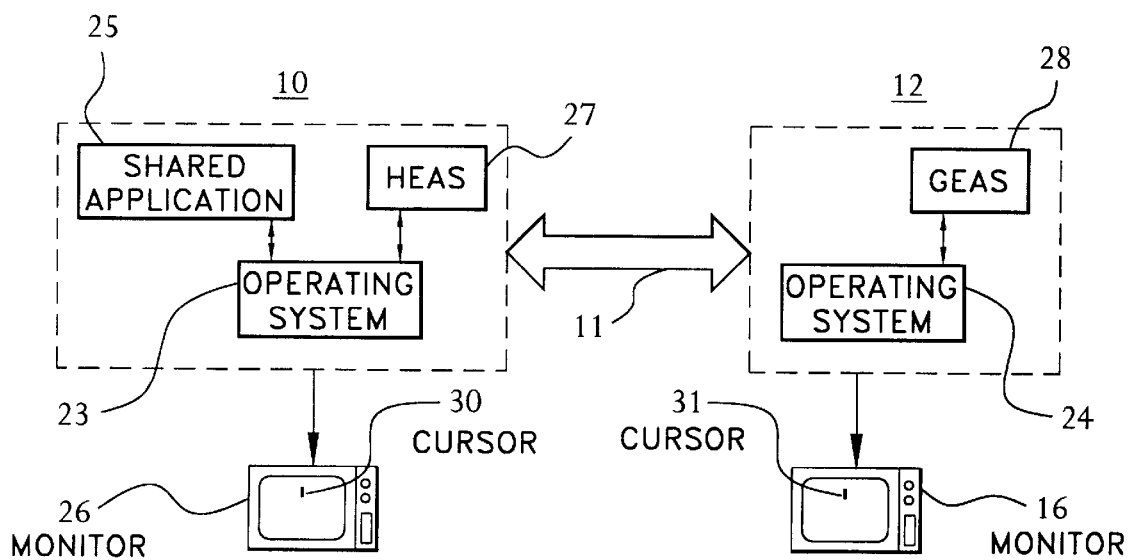
FIG. 2 is a block diagram of software of an applications-sharing system.

Referring now to FIG. 2, a software architecture for applications sharing between host computer 10 and guest computer 12 is shown. Host computer 10 and guest computer 12 are coupled via bidirectional data network 11. Each of host computer 10 and guest computer 12 include respective operating systems 23 and 24. Operating systems 23 and 24 manage the hardware resources of computers 10 and 12, respectively, and invoke and control other programs resident in memory accessible by computers 10 and 12.

Shared application 25 is executed on host computer 10, i.e. is loaded into RAM memory associated with host computer 10, but remains accessible for data input from and output to, and further interaction with, guest computer 12 via bidirectional network 11. Shared application 25 may be, for example, a word processing program enabling creation, editing, printing, etc. of text, which is displayed to participants on monitors 15 and 16. Alternatively, shared application 25 may be any other suitable type of application program. It should be recognized that more than one guest may share application 25, i.e., more than one guest can be coupled to the host 10, and share data with shared application 25 resident on host 10, in the manner described above. Furthermore, more than one application may be shared by the host and any number of guests.

The software architecture of host computer 10 also includes host-executed applications-sharing (HEAS) program 27. Similarly, guest computer 12 is provided with guest-executed applications-sharing program (GEAS) 28. HEAS 27 and GEAS 28 enable host computer 10 and guest computer 12, respectively, to share application program 25, thereby enabling data entry from and essentially simultaneous output of data to each of host and guest computers 10 and 12. For example, if shared application 25 is a word processing program, users at host computer 10 and guest computer 12 may share and operate on the same document, such as by creating, editing, or deleting text. The output of shared application 25 appears essentially simultaneously on each of the monitors 15 and 16 associated with host and guest computers 10 and 12, respectively. Typically, a formal turn-taking mechanism is used to provide a guest with mouse and keyboard input rights. In cases where there are multiple guests, the turn-taking mechanism orchestrates which of the guests, to the exclusion of the others, has a right to control movement of the shared cursor and enter data via a keyboard. Conventionally, a host always can move the shared cursor or enter data from a keyboard regardless of whether it formally has control.

HEAS 27 and GEAS 28 generate shared cursors 30 and 31, respectively, which move in tandem as either the host or guest inputs mouse movements, provided, for example, that the guest has control. For example, a host, by moving cursor 30 on host monitor 15, will control and move guest shared cursor 31 on guest monitor 16. Typically, host shared cursor 30 is the host's local cursor, which is shared with a guest when the guest has the turn. Guest shared cursor 31 typically is a cursor separate and apart from the guests local cursor, except when the guest has the turn, in which case the guest local and shared cursors merge to become guest shared cursor 31.

Figure 3:
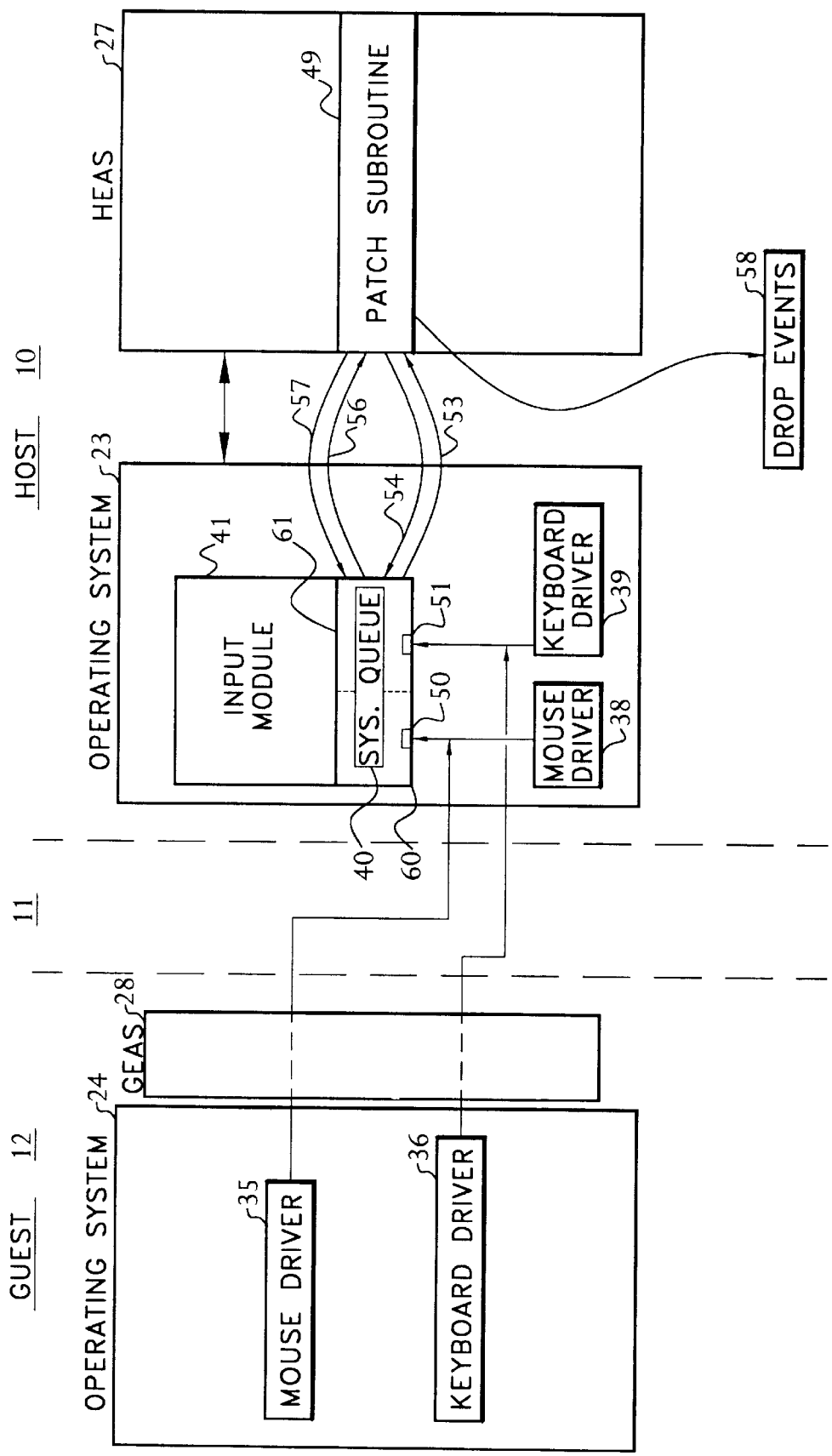
FIG. 3 is a block diagram of the software architecture of a preferred embodiment of the invention.

Referring now to FIG. 3, an arrangement for blocking input by a host in an applications-sharing configuration when a guest has control of input is shown. Typically, control is obtained by being the first to move the shared cursor or enter keyboard input after an absence for a predetermined period of input from the previous participant having control. Guest 12 includes mouse driver 35 and keyboard driver 36, for example in its operating system software 24, for generating mouse and keyboard events, respectively. Mouse and keyboard events generated by guest 12 can be, for example, transmitted over network 11 to host 10. GEAS 28, for example, can administer the transmission to host system 10 of the mouse and keyboard events from guest 12.

Mouse and keyboard events from guest system 12 are coupled to the host's mouse and keyboard event input streams associated with the host mouse driver 38 and keyboard driver 39, respectively, and thereby delivered to keyboard event procedure 60 and mouse event procedure 61, respectively, of input module 41 of operating system 23 of host 10. Although not shown, HEAS 27 preferably manages delivery of mouse and keyboard events from GEAS 28 of guest 12. Mouse and keyboard events from both guest 12 and host 10 typically are deposited in host system queue 40, which is a pipeline of data and is part of input module 41 of host operating system 23. System queue 40 passes data on a first-in, first-out (FIFO) basis to, for example a shared application (not shown in FIG. 3).

In a preferred embodiment of the invention, HEAS 27 includes a patch subroutine 49 to control input to system queue 40 and to prevent host 10 from entering mouse and keyboard events into system queue 40 from host mouse driver 38 and host keyboard driver 39, respectively, when the host does not have control. Patch instructions 50 and 51 are written over keyboard event procedure 60 and mouse event procedure 61. Keyboard event procedure 60 and mouse event procedure 61 are software subroutines in host operating system 23 which manage placement of events from the keyboard and mouse drivers 38 and 39, respectively, into system queue 40.

Referring now to FIG. 4, there is shown a flow chart showing the processing of host mouse and keyboard events. When host mouse and keyboard drivers 38 and 39 deliver keyboard or mouse events for deposit in system queue 40 (step 52 of FIG. 4), patch instructions 50 or 51, written over keyboard event procedure 60 and mouse event procedure 61 cause a jump (step 53) to patch subroutine 49 which is part of HEAS 27. In a preferred embodiment, if host 10 has control (step 53.5), HEAS 27 writes the original keyboard or mouse event procedures 60 and 61, respectively, over patch instructions 50 or 51 (step 54). Keyboard or mouse event procedures 60 and 61 execute, resulting in placement of the respective keyboard or mouse event into system queue 40 (step 55). After keyboard event procedure 60 or mouse event procedure 61 completes its execution to deposit a keyboard or mouse event in system queue 40 (step 55), it returns to patch subroutine 49 (step 56). Patch subroutine 49 rewrites the patch instructions over the keyboard event procedure 60 or mouse event procedure 61 (step 57), thereby enabling the cycle to begin anew with the receipt of new events from mouse driver 38 or keyboard driver 39.

When host mouse or keyboard events are delivered (step 52) when the host is without control, patch instructions 50 and 51 cause a jump to patch subroutine 49 (step 53) in the manner described above. However, HEAS 27 will identify that the host does not have control (step 53.5), at which point patch subroutine 49 simply drops the keyboard or mouse event (step 58).

In conventional applications-sharing systems, a host could deposit mouse and keyboard events into the system queue irrespective of whether it actually had control. As noted above, this typically resulted in battles for control of the movement of the shared cursor when the guest has control. Also, simultaneous keyboard input from the guest and the host would unintelligibly interleave. In the invention, however, patch instructions 50 and 51 cause a jump 53 to patch subroutine 49 upon receipt of mouse and keyboard events from host mouse driver 38 and host keyboard driver 39. The jump to patch subroutine 49 occurs before the events are deposited in system queue 40. Patch subroutine 49 controls what happens to the events based on whether host 10 has control at the time the events are submitted to keyboard event procedure 60 or mouse event procedure 61 for entry into system queue 40.

In a preferred embodiment, patch subroutine 49 is responsive to an override which indicates that host events should be deposited for execution, regardless of whether host 10 has control. For example, a pre-defined "hot-key" could be configured to enable host 10 to at any time take control of input from a guest. The hot-key can be, for example, a keyboard key or some combination of keys or a mouse button. In the event a host user actuates the hot-key, host 10 is granted control to input. Subroutine 49 processes subsequently entered mouse and keyboard events with an understanding that host 10 has control. This feature enables a host at any time to obtain input-entering rights and is particularly useful in the event an emergency response from host 10 is required.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

Furthermore, it should be understood that various changes in the details, materials, and arrangements of the parts which have been described and illustrated in order to explain the nature of this invention may be made by those skilled in the art without departing from the principle and scope of the invention as expressed in the following claims.

What we claim is:

1. In a host computer having an operating system, a method for sharing a shared application with at least one guest, wherein the host and the at least one guest are shared application participants, the method comprising the steps of:
   (a) governing with a host-executed applications-sharing program which shared application participant has control to enter input to the shared application, wherein the operating system comprises an entry point code for managing placement of input into a host system queue;
   (b) writing, with the applications-sharing program, a patch instruction over the entry point code, wherein the patch instruction causes the operating system to jump to a patch subroutine of the applications-sharing program when the entry point code is called;
   (c) running, with the operating system, the patch instruction instead of the entry point code and jumping to the patch subroutine, when a host input is received;
   (d) determining, with the patch subroutine, whether the host has control to enter input to the shared application;
   (e) if the host has control to enter input to the shared application, then: writing the entry point code over the patch instruction with the patch subroutine, executing, with the operating system, the entry point code to place the host input into the host system queue, and rewriting, with the applications-sharing program, the patch instruction over the entry point code; otherwise, if the host does not have control to enter input to the shared application, then discarding the host input.

2. The method of claim 1, further comprising the step of repeating steps (c)–(e) upon receipt of subsequent host inputs.

3. The method of claim 1, further comprising the steps of:
   (f) receiving, with the applications-sharing program, a guest input from a guest;
   (g) determining, with the applications-sharing program, whether the guest has control to enter input to the shared application; and
   (h) if the guest has control to enter input to the shared application, then: writing the entry point code over the patch instruction with the patch subroutine, executing, with the operating system, the entry point code to place the guest input into the host system queue, and rewriting, with the applications-sharing program, the patch instruction over the entry point code; otherwise, if the guest does not have control to enter input to the shared application, then discarding the guest input.

4. The method of claim 1, wherein step (a) comprises the step of governing with the host-executed applications-sharing program which shared application participant has control to enter input to the shared application in accordance with a turn-taking scheme in which each participant is allocated turns and in which each participant has control only during its respective turn.

5. The method of claim 1, wherein the host system queue passes data on a first-in, first-out basis to the shared application.

6. The method of claim 1, wherein step (d) comprises the step of determining that the host has control to enter input if it is the host's turn to enter input or if a host-event override condition exists.

7. The method of claim 1, wherein step (c) comprises the further step of receiving with the operating system a host input when a host event causes an operating system interrupt.

8. A storage medium having stored thereon a plurality of instructions for causing a host computer having an operating system to share a shared application with at least one guest, wherein the host and the at least one guest are shared application participants, wherein the plurality of instructions, when executed by a processor of the host, cause the processor to perform the steps of:
   (a) governing with a host-executed applications-sharing program which shared application participant has control to enter input to the shared application, wherein the operating system comprises an entry point code for managing placement of input into a host system queue;
   (b) writing, with the applications-sharing program, a patch instruction over the entry point code, wherein the patch instruction causes the operating system to jump to a patch subroutine of the applications-sharing program when the entry point code is called;
   (c) running, with the operating system, the patch instruction instead of the entry point code and jumping to the patch subroutine, when a host input is received;
   (d) determining, with the patch subroutine, whether the host has control to enter input to the shared application;
   (e) if the host has control to enter input to the shared application, then: writing the entry point code over the patch instruction with the patch subroutine, executing, with the operating system, the entry point code to place the host input into the host system queue, and rewriting, with the applications-sharing program, the patch instruction over the entry point code; otherwise, if the host does not have control to enter input to the shared application, then discarding the host input.

9. The storage medium of claim 8, wherein the plurality of instructions cause the processor to perform the further step of repeating steps (c)–(e) upon receipt of subsequent host inputs.

10. The storage medium of claim 8, wherein the plurality of instructions cause the processor to perform the further steps of:
    (f) receiving, with the applications-sharing program, a guest input from a guest;
    (g) determining, with the applications-sharing program, whether the guest has control to enter input to the shared application; and
    (h) if the guest has control to enter input to the shared application, then: writing the entry point code over the patch instruction with the patch subroutine, executing, with the operating system, the entry point code to place the guest input into the host system queue, and rewriting, with the applications-sharing program, the patch instruction over the entry point code; otherwise, if the guest does not have control to enter input to the shared application, then discarding the guest input.

11. The storage medium of claim 8, wherein step (a) comprises the step of governing with the host-executed applications-sharing program which shared application participant has control to enter input to the shared application in accordance with a turn-taking scheme in which each participant is allocated turns and in which each participant has control only during its respective turn.

12. The storage medium of claim 8, wherein step (d) comprises the step of determining that the host has control to enter input if it is the host's turn to enter input or if a host-event override condition exists.

13. The storage medium of claim 8, wherein step (c) comprises the further step of receiving with the operating system a host input when a host event causes an operating system interrupt.

14. A host computer for sharing a shared application with at least one guest, wherein the host and the at least one guest are shared application participants, the host computer comprising:

an operating system; and a memory which stores a sequence of instructions which, when executed by the operating system, cause the host computer to perform the steps of:
 (a) governing with a host-executed applications-sharing program which shared application participant has control to enter input to the shared application, wherein the operating system comprises an entry point code for managing placement of input into a host system queue;
 (b) writing, with the applications-sharing program, a patch instruction over the entry point code, wherein the patch instruction causes the operating system to jump to a patch subroutine of the applications-sharing program when the entry point code is called;
 (c) running, with the operating system, the patch instruction instead of the entry point code and jumping to the patch subroutine, when a host input is received;
 (d) determining, with the patch subroutine, whether the host has control to enter input to the shared application;
 (e) if the host has control to enter input to the shared application, then: writing the entry point code over the patch instruction with the patch subroutine, executing, with the operating system, the entry point code to place the host input into the host system queue, and rewriting, with the applications-sharing program, the patch instruction over the entry point code; otherwise, if the host does not have control to enter input to the shared application, then discarding the host input.

15. The host computer of claim 14, wherein the plurality of instructions cause the host computer to perform the further step of repeating steps (c)–(e) upon receipt of subsequent host inputs.

16. The host computer of claim 14, wherein the plurality of instructions cause the host computer to perform the further steps of:
 (f) receiving, with the applications-sharing program, a guest input from a guest;
 (g) determining, with the applications-sharing program, whether the guest has control to enter input to the shared application; and
 (h) if the guest has control to enter input to the shared application, then: writing the entry point code over the patch instruction with the patch subroutine, executing, with the operating system, the entry point code to place the guest input into the host system queue, and rewriting, with the applications-sharing program, the patch instruction over the entry point code; otherwise, if the guest does not have control to enter input to the shared application, then discarding the guest input.

17. The host computer of claim 14, wherein step (a) comprises the step of governing with the host-executed applications-sharing program which shared application participant has control to enter input to the shared application in accordance with a turn-taking scheme in which each participant is allocated turns and in which each participant has control only during its respective turn.

18. The host computer of claim 14, wherein the host system queue passes data on a first-in, first-out basis to the shared application.

19. The host computer of claim 14, wherein step (d) comprises the step of determining that the host has control to enter input if it is the host's turn to enter input or if a host-event override condition exists.

20. The host computer of claim 14, wherein step (c) comprises the further step of receiving with the operating system a host input when a host event causes an operating system interrupt.

* * * * *